US011903905B2

(12) United States Patent
Waugh et al.

(10) Patent No.: US 11,903,905 B2
(45) **Date of Patent: *Feb. 20, 2024**

(54) MEDICATION DELIVERY APPARATUS

(71) Applicant: AceAge Inc., Burlington (CA)

(72) Inventors: Donald Spencer Waugh, Hamilton (CA); Wesley van Ooyen, Burlington (CA); Samuel Campbell, Kitchener (CA); Dylan Horvath, Toronto (CA); Charlie Man, Toronto (CA); Art De Guzman, Toronto (CA); Gerald van Wyngaarden, Toronto (CA); Borys Chylinski, Toronto (CA)

(73) Assignee: AceAge Inc., Burlington (CA)

( * ) Notice: Subject to any disclaimer, the term of this patent is extended or adjusted under 35 U.S.C. 154(b) by 564 days.

This patent is subject to a terminal disclaimer.

(21) Appl. No.: 16/932,723

(22) Filed: Jul. 18, 2020

(65) Prior Publication Data

US 2020/0375851 A1 Dec. 3, 2020

Related U.S. Application Data

(63) Continuation of application No. 16/671,412, filed on Nov. 1, 2019, now Pat. No. 10,751,257, which is a (Continued)

(51) Int. Cl.
*A61J 7/00* (2006.01)
*A61J 7/04* (2006.01)

(52) U.S. Cl.
CPC ........... *A61J 7/0084* (2013.01); *A61J 7/0427* (2015.05); *A61J 2200/30* (2013.01); *A61J 2205/10* (2013.01)

(58) Field of Classification Search
CPC .... A61J 7/0084; A61J 7/0427; A61J 2205/10; A61J 2200/30

(Continued)

(56) References Cited

U.S. PATENT DOCUMENTS

| | | | | |
|---|---|---|---|---|
| 6,394,306 | B1 * | 5/2002 | Pawlo ................ | B65D 83/0472 221/2 |
| 6,766,920 | B2 * | 7/2004 | Yuyama .............. | G07F 17/0092 221/266 |

(Continued)

FOREIGN PATENT DOCUMENTS

| | | | |
|---|---|---|---|
| CA | 2953399 | A1 | 12/2015 |
| EP | 273417 | B1 | 9/2016 |

*Primary Examiner* — Michael Collins
(74) *Attorney, Agent, or Firm* — Stuart L. Wilkinson

(57) ABSTRACT

An assembly for delivering medication to a patient has a cartridge loadable with a coiled strip of successively, physically linked medication-containing pouches. The cartridge is inserted into a delivery unit which has an advance mechanism which engages the strip and drives pouches successively out of the cartridge. Pouches are fed successively to an inspection mechanism and a separation station. At the inspection station indicia on successive pouches representing a medication schedule are inspected and compared and validated against a separately stored medication schedule recorded at the time the medication is packaged in the cartridge. A separation mechanism mounted at the separation station is used to separate a pouch at the leading end of the strip from the adjacent pouches. At a pouch exit, separated pouches are routed to a delivery zone.

20 Claims, 10 Drawing Sheets

Related U.S. Application Data continuation-in-part of application No. 15/079,907, filed on Mar. 24, 2016, now Pat. No. 10,503,875.

(60) Provisional application No. 62/157,858, filed on May 6, 2015.

(58) Field of Classification Search
USPC .................................................. 700/231–244
See application file for complete search history.

(56) References Cited

U.S. PATENT DOCUMENTS

| | | | | |
|---|---|---|---|---|
| 7,395,946 | B2 * | 7/2008 | Yuyama | G07F 17/0092 221/265 |
| 8,135,497 | B2 * | 3/2012 | Joslyn | A61J 7/0076 700/237 |
| 8,417,378 | B2 * | 4/2013 | Joslyn | A61J 7/0409 700/237 |
| 9,351,907 | B2 * | 5/2016 | Luoma | A61J 7/04 |
| 10,751,257 | B2 * | 8/2020 | Waugh | A61J 7/0427 |
| 2002/0165641 | A1 * | 11/2002 | Manalang | A61G 12/001 700/237 |
| 2005/0049747 | A1 * | 3/2005 | Willoughby | A61J 7/04 700/232 |
| 2006/0184271 | A1 * | 8/2006 | Loveless | G07F 17/0092 700/231 |
| 2008/0059228 | A1 * | 3/2008 | Bossi | G07F 17/0092 705/2 |
| 2008/0156824 | A1 * | 7/2008 | DerMarderosian | B65G 47/847 221/157 |
| 2009/0043605 | A1 | 2/2009 | Imai et al. | |
| 2011/0172812 | A1 * | 7/2011 | Joslyn | A61J 7/0076 700/232 |
| 2012/0083666 | A1 * | 4/2012 | Waugh | A61J 7/04 600/300 |
| 2012/0101630 | A1 * | 4/2012 | Daya | G07F 17/0092 700/231 |
| 2013/0110283 | A1 | 5/2013 | Baarman et al. | |
| 2013/0282163 | A1 * | 10/2013 | Brown | G07F 17/0092 700/215 |
| 2016/0355322 | A1 * | 12/2016 | Burton, Jr. | A61J 7/0481 |
| 2018/0015001 | A1 | 1/2018 | Apell et al. | |
| 2018/0079586 | A1 | 3/2018 | Surtou, Jr. et al. | |
| 2018/0086547 | A1 | 3/2018 | Sridges et al. | |

* cited by examiner

MEDICATION DELIVERY APPARATUS

CROSS REFERENCE TO RELATED PATENTS

The present application is a continuation of U.S. patent application Ser. No. 16/671,412 filed Nov. 1, 2019 entitled "Medication delivery apparatus". U.S. patent application Ser. No. 16/671,412 is a continuation-in-part of U.S. patent application Ser. No. 15/079,907 filed Mar. 24, 2016, entitled "Medication administration apparatus", issued as U.S. Pat. No. 10,503,875 on Dec. 10, 2019. U.S. patent application Ser. No. 15/079,907 claims priority from U.S. provisional patent application 62/157,858, filed May 6, 2015. The disclosures of each of the aforesaid applications are incorporated herein by reference in their entirety and made part of the present application for all purposes.

FIELD OF THE INVENTION

This invention relates to apparatus and methods for delivering medication to a patient or other user. In this specification, although delivery and dispensing of medication may be used interchangeably, it will understood that 'dispensing' is not used in the pharmacy sense of filling a prescription but in the sense of 'delivering' medicine to a patient or other authorized person.

BACKGROUND

Medication adherence issues account for a significant amount of unnecessary expenditures and may result in suboptimal healthcare outcomes and/or problems for patients. Adherence to medication intake (the administering of the correct dosage at the correct date and time) has been a significant challenge in the healthcare field. Known products designed to promote adherence to medication have not been very effective. For example, a patient may be provided with several pharmaceutical products for consumption at various times of the day, with the timing of the intake of the products, as well as the dosages being important (e.g., based on a dosing regimen) from a pharmacokinetic perspective (e.g., maintaining a therapeutic dosage level in the bloodstream). Deviating from the particular dosage regimen may have adverse effects on the health of a patient (e.g., straying outside a therapeutic range, straying into a range having toxic side effects), and may also result in increased costs and/or the proliferation of medicines that should have otherwise been consumed by patients. The failure of patients to adhere to their medication regime properly can also be detrimental to clinical research. Participants in drug trials are generally trusted to take their medication properly and report their results at the end of the trial. Without any existing measures in place to document how the patients in these trials are taking their medication, non-compliant patients may be included in the data set of these trials. This may lead to inaccurate reporting of the effects of the medication and can result in medication not achieving regulatory approval when it should receive approval or receiving approval when it should not. Some devices and techniques require manual administration and loading by the patient, a care giver, professional support worker or a pharmacist (hereinafter "user"). Manual administration has led to devices that are prone to error and adherence failure, with an inability to conduct practical monitoring of patient adherence. Further, the devices may also be loaded incorrectly, causing potential harm to a patient (e.g., a practitioner unintentionally loads a device with the wrong dosage or type of medication).

SUMMARY OF THE INVENTION

According to an aspect of the invention an assembly for delivering medication comprising a cartridge loadable with a strip of linked medication-containing pouches and a delivery unit engageable with the cartridge in an operational juxtaposition, the delivery unit having an advance mechanism operable to engage and to advance the strip in a delivery direction and to bring pouches of the strip successively to a separation station, an inspection mechanism to inspect indicia on a pouch, a separation mechanism at the separation station for separating a pouch at the leading end of the strip from the adjacent pouch, and an exit route from the delivery unit for routing the separated pouch to an access zone. The cartridge can have a shaped projecting part and the delivery unit can have a complementary shaped recess or docking bay. The shaped projecting part can be disengagebly engageable with the complementary shaped bay solely by the acts of relatively orientating the cartridge and the delivery unit so that the projecting part faces the bay, and relatively moving the cartridge and the delivery unit together. Preferably, the cartridge, when engaged with the delivery unit, is held in the bay by a latching arrangement or by magnetic attraction between a magnet on the cartridge and a magnet on the delivery unit. The magnet can be one of a permanent magnet and an electromagnet. Preferably, the cartridge and the delivery unit, when relatively orientated so that the projecting part faces the bay and when being moved together, experience magnetic attraction tending to move the cartridge to the engaged juxtaposition when the cartridge is yet separated from the delivery unit by a preset distance determined by the strength of the magnetic attraction.

In use, a strip of successively, physically linked medication-containing pouches for insertion in the cartridge is in the form of a coil and the cartridge can have a chamber for accommodating the coil, the chamber at least partially defined by at least one arcuate wall. The chamber preferably occupies a cylinder at least partially defined by said at least one arcuate wall, the cylinder, when not occupied by the coil of medication-containing pouches, being empty. Preferably, the cartridge has a cartridge engagement site immediately adjacent a delivery unit engagement site when the cartridge and the delivery unit are in the operational juxtaposition, the engagement sites having surface formations preventing lateral movement of the cartridge relative to the delivery unit when in the operational juxtaposition. In the operational juxtaposition, the cartridge preferably has a front side engaging the delivery unit, and a back side shaped and sized for palm-of-the-hand gripping of the cartridge. The cartridge can have a finger hold formation in the back side to enable finger pulling of the cartridge to separate the cartridge from the delivery unit. Preferably, the cartridge has two interengaging shell members, and a lock member movable between a first position to lock the shell members together to enclose the chamber and a second position enabling the shell members to be at least partly separated to provide access to the chamber interior.

The cartridge preferably has a guidance route for pouches of the strip thereof successively driven out of the cartridge chamber, the guidance route including a lobe over which successive pouches are driven, the lobe having a downstream region of relatively high radius of curvature and a contiguous upstream region of relatively low radius of curvature.

The separation mechanism preferably includes a rotary knife mounted in a shuttle for reciprocating movement, the shuttle including a lead screw for driving a carriage in which the knife is mounted.

The delivery unit is preferably configured with a delivery route sloping downwardly from a cutting station to a delivery tray, the delivery route having a base formed as a series of steps. The delivery route can have lateral wall formations, the spacing of the wall formations increasing from an upstream route position to a downstream route position. Preferably, the delivery tray has a barrier wall for halting motion of a falling pouch, and the barrier wall has a lower center part for facilitating finger access to a halted pouch. The delivery tray preferably has a barrier wall for halting motion of a falling pouch, the barrier wall having an overhanging flange for preventing a pouch from bouncing out of the tray on being halted at the barrier.

The advance mechanism includes a drivable wheel mounted on the delivery unit, the wheel having a pouch-contacting surface of high friction, low stiction material. Preferably, the wheel is spring biased towards a back plate forming part of the cartridge. The wheel preferably contacts a side seal at one side of a pouch when the pouch is located on the back plate. The back plate is preferably made from low friction material, light colored material to facilitate imaging of print indicia on transparent film pouches when mounted on the back plate. The assembly preferably further comprises spaced walls upstanding from the back plate to retain a pouch strip when fed along the back plate. The assembly preferably further comprises a retaining flange projecting from one of the side walls and located above a side seal at one side of a pouch when the pouch is located on the back plate.

The assembly preferably further comprises a cam member mounted on the delivery unit and a pouch strip clamping foot mounted at the cartridge to clamp the strip against movement thereof in a feed direction, the cam member having a cam engageable with the clamping foot upon rotation of the cam member to lift the clamping foot from the pouch strip and to permit movement thereof in the feed direction.

The assembly preferably further comprises a second cam mounted either on the a cam member or mounted separately, and a knife shuttle mounted on the delivery unit, the second cam engageable with a cam follower forming part of the knife shuttle to follow rotation of the second cam and thereby to control movement of the knife shuttle between a home position and an operational position in which a knife bears against the pouch strip. Preferably, the first clamping foot cam and the second knife shuttle cam are formed on the same rotary cam member.

According to another aspect of the invention, a method of separating an unclamped leading pouch from a clamped immediately following pouch in a strip of pouches comprising driving the pouches in a feed direction to bring a seal zone between the leading pouch and the following pouch to a cutting station, clamping the following pouch, applying a cut across the strip at the seal zone, unclamping the following pouch, driving the following pouch in a reverse direction, clamping the leading pouch if the leading pouch is not fully severed from the following pouch, further driving the following pouch in the reverse direction to pull the following pouch away from the leading pouch if the leading pouch is not fully severed from the following pouch, unclamping the leading pouch and feeding the following pouch forward in preparation for further cutting of the strip.

According to a further aspect of the invention, there is provided a method of severing a leading pouch from an immediately following pouch in a strip of pouches, the strip formed from a folded length of film material that is heat sealed at a side edge of the strip remote from the fold and at end zones located at spaced intervals along the strip, the method comprising feeding a leading end of the strip to a back plate at a cut site and severing the leading pouch from the following pouch by pressing a knife onto the strip and against the back plate, and driving a knife across the full width of the strip at the end zone between the leading pouch and the following pouch using a cut sequence in which the heat sealed side edge receives more cut strokes than the end zones. The cut sequence can include one cut forward and back across the full width of the strip and another cut aligned with the first cut forward and back across the heat sealed side edge. Preferably, the cut sequence provides an optimal situation between saving wear on the knife and reducing incidences of pouches that are nominally severed but remain hung and not detached. Preferably the cutting of the leading pouch from the immediately following pouch is preceded by pressing and driving the knife against the side edge seal at a position intermediate the end sealed zones at opposite ends of the leading pouch. In this way, a nick is formed across said side edge seal to facilitate subsequent opening by a user of the leading pouch once severed from the immediately following pouch.

According to a further aspect of the invention, there is provided a method of monitoring separation of a leading pouch from a linked strip of pouches comprising applying a full cut across the strip and against a back plate with the intent of separating the leading pouch from the remaining pouches so that the leading pouch drops to and is arrested at a delivery zone, and operating a sensor to sense, within a time window after applying said cut, whether the leading pouch is at the delivery zone.

According to a further aspect of the invention, there is provided a method of positioning a strip of pouches in preparation for cutting a leading pouch from an immediately following pouch, the pouches each having a laterally extending fiducial formation printed thereon for use in effecting movement control of the pouches along a delivery axis, the method comprising stepwise moving the strip by performing movement, fiducial formation inspection, movement sequences along the axis until the position of the fiducial formation is detected to be within a predetermined threshold of an ideal fiducial formation position.

According to a further aspect of the invention, a pouch used in positioning a strip of pouches in preparation for cutting thereof has two printed fiducial formations thereon, the fiducial formations being within a predetermined distance of each other in a pouch feed direction, the fiducial formations for use with image analysis software configured to detect each of the fiducial formations if, in each case, the fiducial formation is within a threshold distance of an ideal position for the fiducial formation. If the positioning of the pouch is not within the threshold distance of the ideal position as evaluated by image analysis of the fiducial formation, the pouch is repositioned by the drive subsystem and the pouch position re-evaluated using image analysis.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
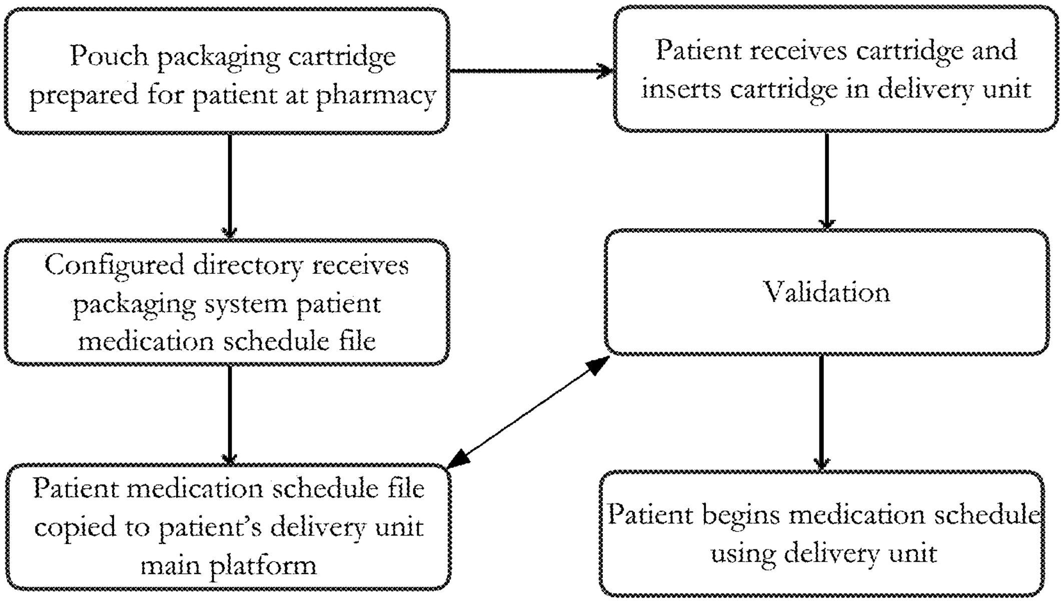
FIG. 1 is a flow diagram of a method according to an embodiment of the invention showing actions taking place at a pharmacy, at a central storage platform and at a patient site.
Figure 2:
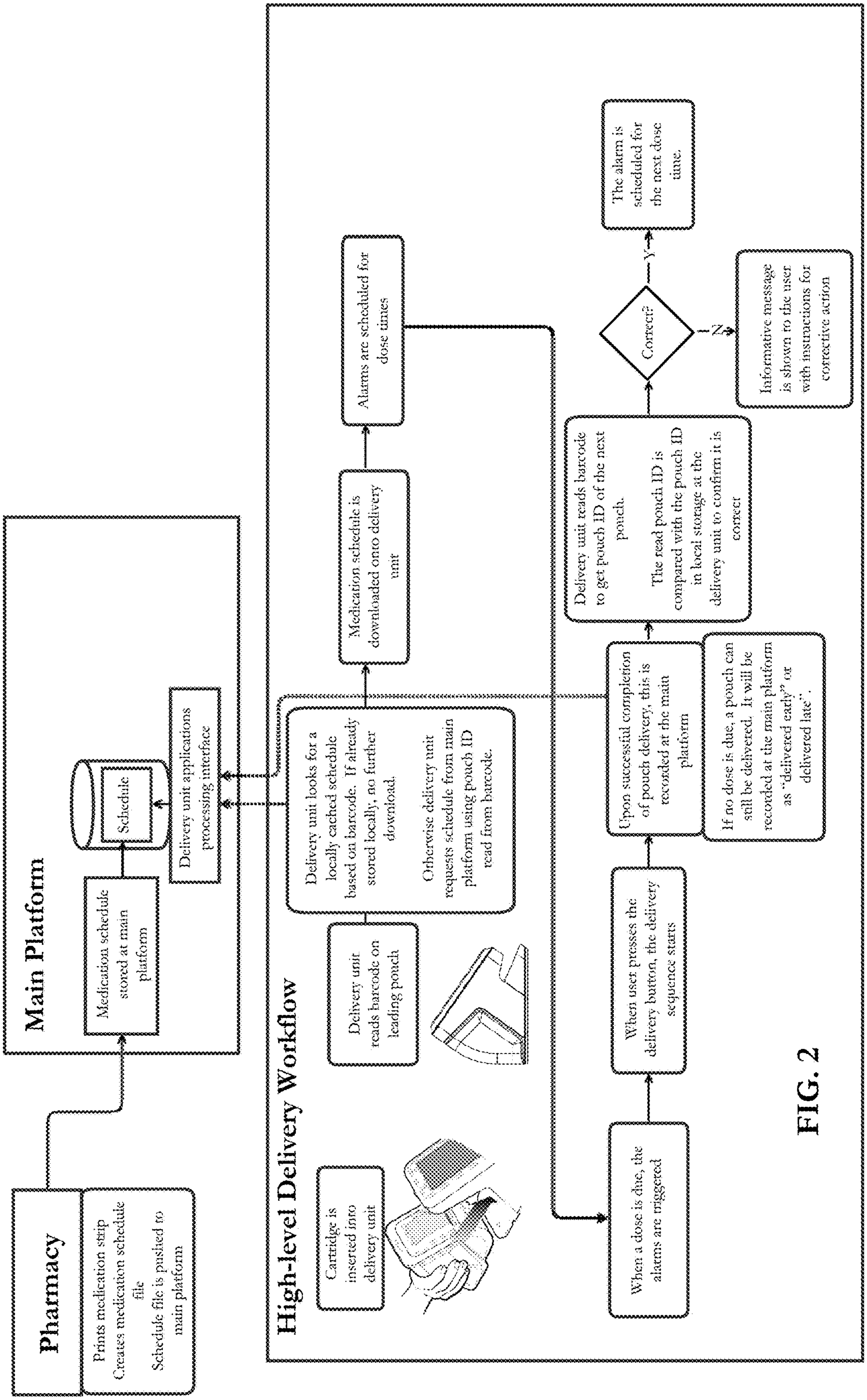
FIG. 2 is a flow diagram of a method according to an embodiment of the invention showing actions resulting after loading a cartridge into a delivery unit.
Figure 3:
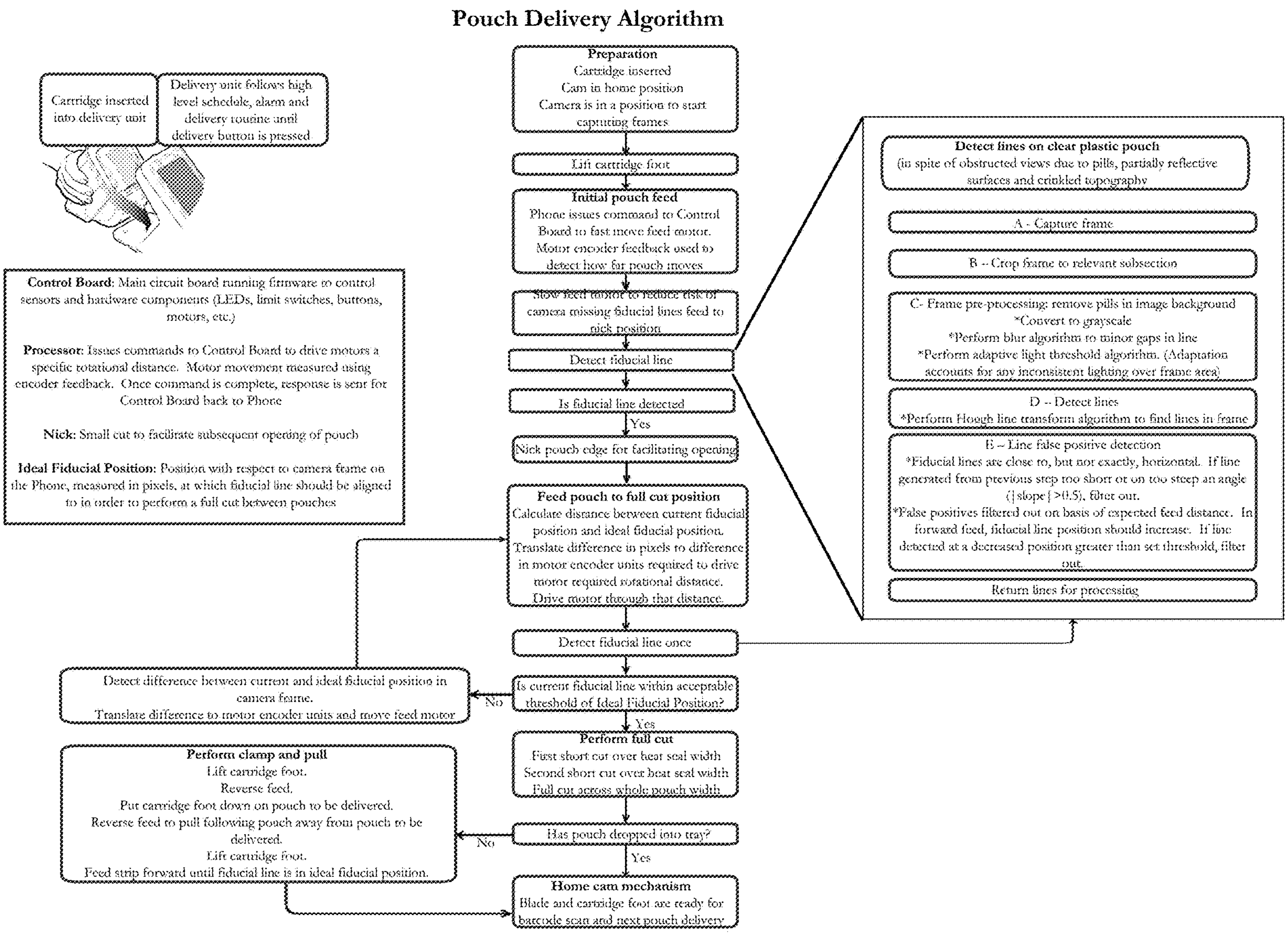
FIG. 3 is a flow diagram of a sub-routine according to an embodiment of the invention showing actions resulting when a patient issues an instruction for a medication delivery.

As shown by the flow diagrams of FIGS. 1, 2 and 3, delivery of a pouch containing medication to a patient or other user according to one embodiment of the invention involves several stages with multiple actions occurring at each stage and at different sites. FIG. 1 is an overall flow diagram showing actions taking place at a pharmacy or other packaging site, actions at a central storage platform and yet other actions taking place at a patient site. FIG. 2 is a flow diagram showing actions resulting after loading a cartridge into a delivery unit up to the time that delivery of a medication dose is complete and the unit has been readied for a next dose. FIG. 3 shows a sub-routine resulting from a patient or other user at the patient site initiating a medication delivery.

Referring back to FIG. 1, at the pharmacy, patient-specific, unit-dose pouches of medication are produced. The medicine itself is prepared beforehand as pills, including tablets or like medication dose delivery units and, at the pharmacy or other packaging site, pills are inserted into pouches.

The pouches are physically linked as a strip and are in a sequence corresponding to successive times at which particular medication doses contained in successive pouches are to be ingested or otherwise taken by a particular patient. The strip is coiled to enable insertion into a patient-specific cartridge. Typically, a strip comprises a folded length of transparent film, either composed of thermoplastic material or having a thermoplastic surface ply. Using heat and pressure, the folded length is sealed at opposite side edge zones and at periodic lateral zones so as to create a rectangular pouch between adjacent end zones with a medication dose contained in each pouch.

At the time the medication is packaged at the pharmacy or elsewhere, associated medication schedule information is printed on the pouches and the schedule information is also stored in a data file. Subsequently, the patient's medication schedule information travels on the pouches inside the patient-specific cartridge and can also be accessed from the stored data file, wherever that file is sent. In particular, the data file is sent to and stored at a main platform at the time of packaging or at any time thereafter up to the point of preparing to deliver a first pouch from the cartridge to the patient. The main platform typically stores medication schedule information for a number of patients. As described in co-pending U.S. patent application Ser. No. 15/079,907, entitled "Medication administration apparatus", medication schedule data for a particular patient is downloaded from the main platform to a pouch delivery unit located at the patient site when a patient-specific cartridge is inserted into the delivery unit.

As will presently be described in greater detail, barcode or matrix code data on a leading pouch is electronically read in response to cartridge insertion. The delivery unit then searches for any locally cached medication schedule based on information derived from that code. If the schedule is already stored locally at the delivery unit, there is no repeat download at that time, but if it is not so stored, the delivery unit requests the patient's medication schedule from the main system platform based on the identity of the patient identified from the barcode. The medication schedule is downloaded into the delivery unit and alarms are scheduled for specific dose times. Subsequently, at the delivery unit, the patient or other user is informed by the alarm each time that medication is due to be taken. Immediately before delivery or dispensing of a medication dose, the locally stored medication schedule data is compared with the barcode, matrix code and possibly other indicia on the pouch to be delivered to the patient to ascertain whether the medication schedule information printed on the pouch is consistent with the medication schedule information in the stored data file. If there is a match, the pouch can be delivered to the patient, the delivery procedure being initiated by the patient or other user pressing a push button at the delivery unit, usually after having been prompted by an alarm system that it is time to take a medication dose. If there is a mismatch, no pouch delivery can occur and a message to that effect is presented to the patient or other user. Indicia information on a particular pouch may include any or all of a barcode or other machine readable code (including alphanumeric characters) indicative of a pouch ID. The coded information may embody any or all of the name of the patient, name of the medication, a description of the medication, the scheduled time at which the particular medication dose is to be taken by the patient, the date of packaging and the date of expiry. Other content can be added depending, for example, on different jurisdictional requirements as usually detailed by a college of pharmacy. The indica may also include customizable material such as logos or similar content. The delivery unit may, prior to the time of delivering a medication dose, review the locally stored medication schedule and compare it with the schedule stored at the main platform to confirm that it is in fact the latest version and, if it is not, then to download any updates to the schedule.

Also printed on the pouch is a fiducial marking, such as a line, which, as will be described presently, is used for positional control when delivering a pouch from the delivery unit to the patient. While the pouch could be automatically delivered to the patient when a match between pouch indicia and stored data is confirmed, the delivery procedure does not actually begin until the patient, carer or other user operates the push button actuator to instruct the delivery procedure to begin.

Successful completion of a medication dose delivery is monitored and recorded at the main platform. If no dose is due at a particular time, a pouch or pouches can still be delivered upon data being input by the patient or other user at the delivery unit, but is recorded at the main platform as ‘delivered early’ or ‘delivered late’. Early delivery is useful if the patient will be separated from the delivery unit for a period of time, for example, during a vacation, but must still take the medication at prescribed times. Recording late delivery is useful to ensure that a patient does not go without medication for so long as to cause a medical problem and to identify a patient compliance issue needing correction.

Figure 4:
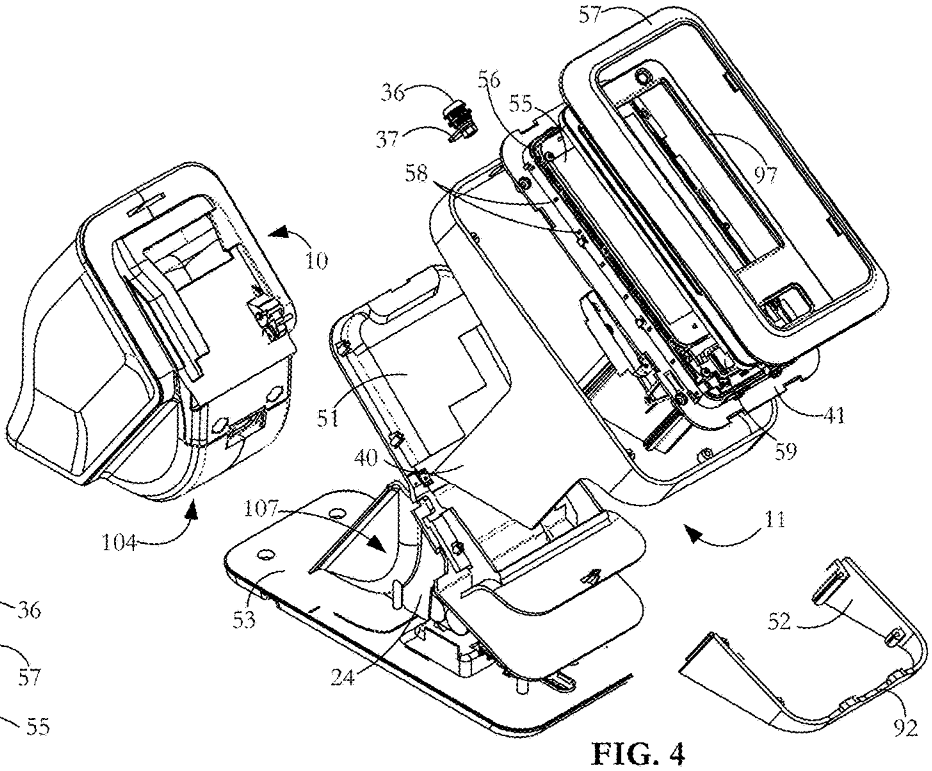
FIG. 4 is an isometric view of a medication delivery unit in exploded view and a medication cartridge for use with the delivery unit according to an embodiment of the invention.
Figure 4B:
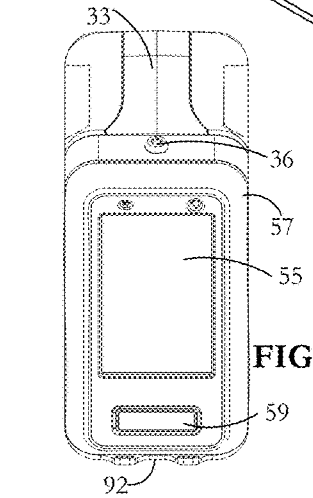
FIG. 4B is a top view of the connected delivery unit and cartridge shown in FIG. 4A.
Figure 4C:
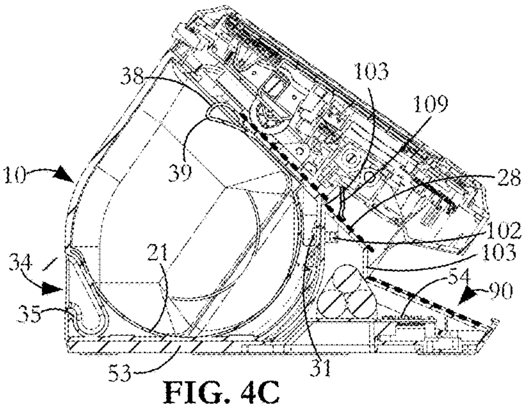
FIG. 4C is a sectional view along the center line of a lower part of the connected delivery unit and cartridge shown in FIG. 4A.
Figure 4A:
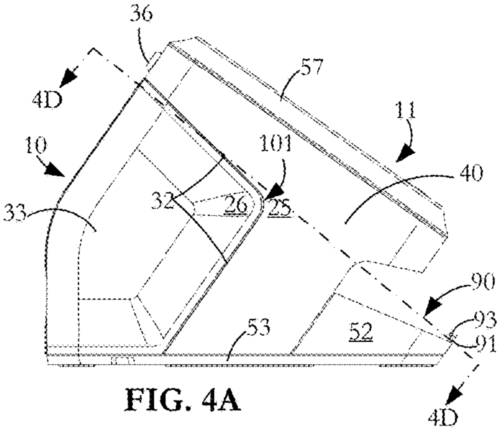
FIG. 4A is a side view of the cartridge and delivery unit of FIG. 4 with the cartridge connected to the delivery unit.

After a pouch delivery, the delivery unit reads the barcode of the immediately following pouch, which then occupies the leading pouch position in the delivery unit. The data from the read pouch ID is compared with the data in delivery unit local storage to confirm it is correct and if that is the case, an alarm is scheduled for the next dose time. If incorrect, an informative message is shown to the user with instructions for corrective action. If at any time, the cartridge is removed, there is a return to the first step: cartridge insertion. An exploded view of an exemplary delivery unit 11 and associated medication cartridge 10 are illustrated in FIG. 4, with FIGS. 4A and 4B showing a side view and a top view of the cartridge 10 connected to the delivery unit 11. As shown in FIGS. 5 to 8, the cartridge 10 has clam shell parts 12 of generally mirrored shape and mating edge features, the parts 12 made of a high impact plastic such as polycarbonate or acrylonitrile butadiene styrene (ABS) selected for its robustness and low cost. The cartridge parts 12 are clipped together at an opening/closing hinge axis and the cartridge is shut by bringing the clam shell parts together at a contact region. The two halves are fitted together at the time of pouch loading and are locked in place to form the cartridge 10 using a locking member which has upper tabs 14 that are inserted into corresponding slots 15 in the clam shell halves 12 and a lower tab 16 which is clipped into aperture 17. The locking member 13 has an integral back plate 18 of substantially the same width as a standard pouch. It is made of a low friction material such as ABS or PVC and is light colored so that printed dark indicia on transparent film pouches can be viewed by an imaging device such as a laser scanner camera 19 (FIG. 10) against the back plate 18. In a variation, the pouch material is opaque in which case a white or light colored back plate is not essential. The interior of the cartridge 10 provides a chamber 20, at least part of which is defined by arcuate wall section 21. To reduce the chance of snagging when a pouch coil contained in the chamber is being unwound, no physical feature projects into a nominal cylinder C partly defined by the wall sections 21. Rudimentary side wall supports 106 extend inwardly from outer walls of the cartridge shells 12 to prevent a pouch coil from sliding against the outer walls and jamming as a result of the coil being skewed.

Figure 7:
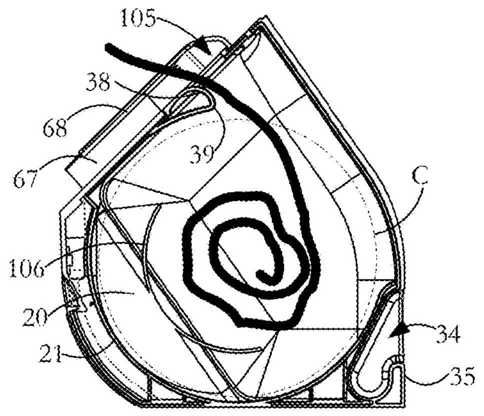
FIG. 7 is a longitudinal section on a center plane of the cartridge shown in FIG. 5.
Figure 8:
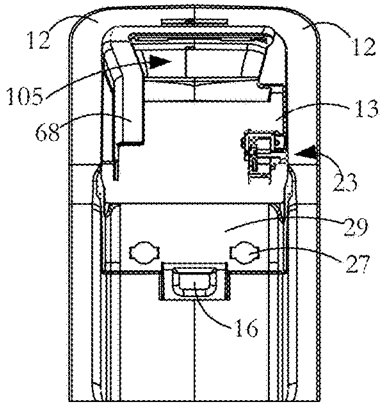
FIG. 8 is a front view of the cartridge shown in FIG. 5.
Figure 11:
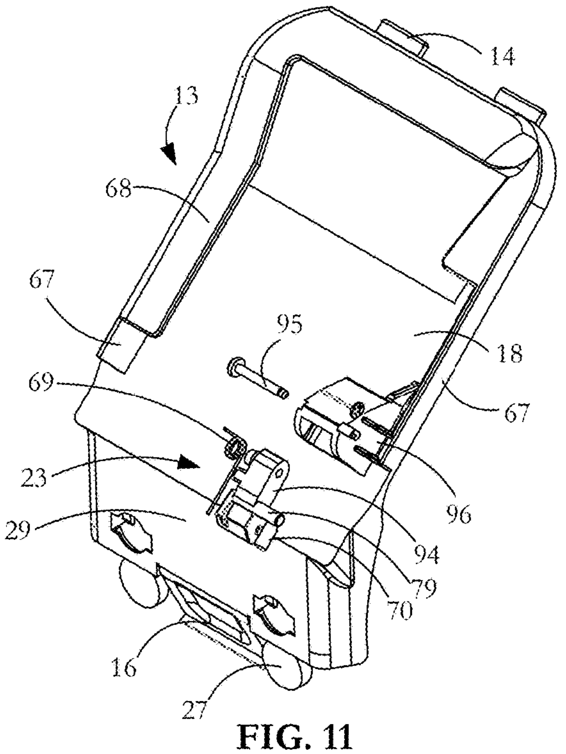
FIG. 11 is a perspective view of a locking member according to an embodiment of the invention which both locks cartridge shell parts together and guides, presents and clamps pouches in place.

At the dispensing pharmacy or other packaging site, the chamber 20 is pre-loaded with the pouch coil with a handedness as shown in FIG. 7 and with the coil axis parallel to the axis of the nominal cylinder C by (i) opening up the two cartridge halves 12, (ii) inserting the coil, (iii) setting a leading pouch in an exit-ready position and (iv) locking the two clam shelf halves back together using the locking member 13 (FIG. 11). In the course of attaching the locking member 13, the leading pouch is pressed against the back plate 18 by a clamping foot 23 (FIG. 5), Patient ease of use is an important criterion for medication dose delivery apparatus. Part of that use is unloading an empty cartridge and replacing it with a full one. For loading a cartridge 10 at the delivery unit 11, enclosure 40 forming part of the delivery unit 11 has, as best seen in FIG. 4A, a V-form recess 25 to receive a complementarily V-form projecting part 26 of the cartridge 10. Once loaded, the cartridge 10 is retained at the delivery unit 11 by attraction between a pair of rare earth, spaced magnets on the cartridge 27 and a corresponding pair of identically spaced magnets 28 (FIG. 4C) mounted at the delivery unit 11. The cartridge magnets 27 are mounted in housings formed in a depending part 29 of the locking member 13. The delivery unit magnets 28 are gripped within spaced pockets integrally formed on an inside wall of lower enclosure 24. To facilitate easy attachment of the cartridge 10 to the delivery unit 11, the magnetic attraction between the respective magnet pairs 27, 28 is made sufficiently strong that the cartridge 10 is pulled into the bay 25 when the cartridge 10 is suitably oriented and within a predetermined distance of the delivery unit 11. Although permanent magnets are used in the illustrated embodiment, electromagnets or a non-magnetic latch arrangement may alternatively be used. Mounted adjacent one of the delivery unit magnets 27 is a Hall effect sensor (not shown) configured to measure the magnetic field disruption when the sets of magnets 27, 28 are brought together as the cartridge 10 seats at the delivery unit 11. The cartridge 10, as seated at the delivery unit 11, is external to the delivery unit. If, in use, the sensed magnetic field disruption is greater than a prescribed threshold, the cartridge 10 is presumed to be fully inserted into the delivery unit 11 and a medication dispense procedure can begin. If the sensed magnetic disruption is less than the prescribed threshold, the cartridge 10 is presumed to be not properly inserted into the delivery unit and software control prevents dispensing of medication until appropriate adjustment is made.

As shown in FIG. 4A, junction regions of the cartridge projecting part 26 and the recess 25 are contoured along contact line 32 so that, when the cartridge 10 is attached to the delivery unit 11, the combination has an essentially unitary appearance as shown in FIG. 4A. The projecting part 25 and the recess 26 have complementary V-form profiles 101 at outer flanking regions. The cartridge and lower enclosure have complementary C-form profiles 104, 107 at an inner central region (FIG. 4). The C and V profiles are 'open' with the result that if a suitably oriented cartridge is moved generally towards the recess, then as the front of the cartridge 10 comes into contact with a wall part of the recess, it is guided automatically in a direction such that the cartridge 10 seats at the delivery unit 11. Step transitions from the central C-shaped parts to the flanking V-form parts of the cartridge 10 and delivery unit 11 ensure that, as the cartridge 10 becomes seated and after it is seated, it cannot move laterally relative to the delivery unit. Placement of the cartridge 10 at the delivery unit 11 is effectively a one step directing of the cartridge 10 towards the delivery unit bay 25 without the requirement for any further manipulation, insertion, twisting, etc.

Figure 5:
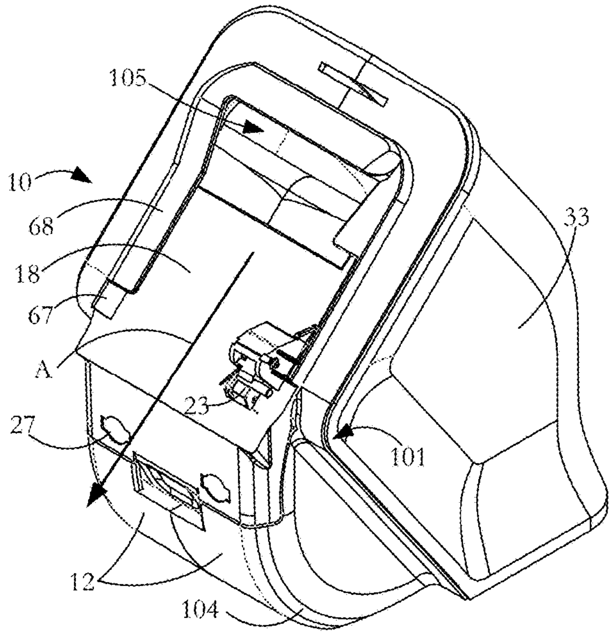
FIG. 5 is an isometric view of a cartridge according to an embodiment of the invention.
Figure 6:
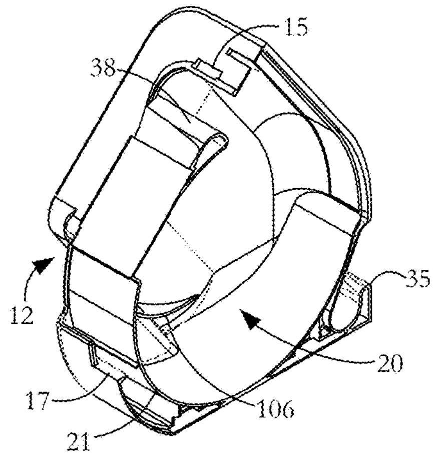
FIG. 6 is an isometric interior view of one of two shell parts forming a part of the cartridge of FIG. 5

To further facilitate ease of use, as shown in FIG. 5, the back 33 of the cartridge is shaped to enable one-handed, thumb-to-fingers gripping of the cartridge 10 in a user's palm. While the shaping is normally sufficient for gripping and holding the cartridge to extract it from, and to insert it into, the delivery unit, the hand hold back 33 of the cartridge has an indentation 34 and finger bar 35 (FIG. 5) enabling the user to hook a finger under the bar 35 to provide a supplementary extraction force. For security purposes as shown in FIG. 4, a lock 36 having a tab 37 movable into engagement with an installed cartridge is mounted at the front end of the main enclosure 24 and enables the cartridge 10 to be locked to the delivery unit 11.

In the course of dose delivery, the loosely wound coil is unwound by driving a leading pouch occupying an exit-ready position along the back plate 18 in the direction A (FIG. 5). As shown in FIG. 7, during pouch delivery, the strip of interconnected pouches is pulled upwardly against the coil's weight which encourages initial unwinding, at least until a part of the coil remaining in the chamber has very few pouches and so very little hanging weight. The strip is urged by a delivery mechanism (FIG. 13) around a shaped lobe formed as part of the cartridge molding. Part 38 of the lobe has a large radius of curvature so that as the coil is pulled from the cartridge interior to an exit slot 105, redirection of a leading end of the strip does not introduce excessive drag. Before reaching the lobe part 38, a trailing part of the strip may contact a lobe part 39 of relatively small radius of curvature if a center portion of the coil is still tightly folded or curled as might occasionally be the case as a pouch strip trailing end approaches the cartridge exit 105. The lobe part 39 acts as a knife to open up a tightly curled part of the coil. At the time of packaging, to reduce the chance of creating an undesirable tightly folded core, the coil is wound in such a way as to ensure loose winding at its center. Typically, the leading and trailing pouches of a strip are left empty at the time of packaging to aid manipulation of the linked pouches and to facilitate reading of indicia printed on the leading pouch.

Figure 9:
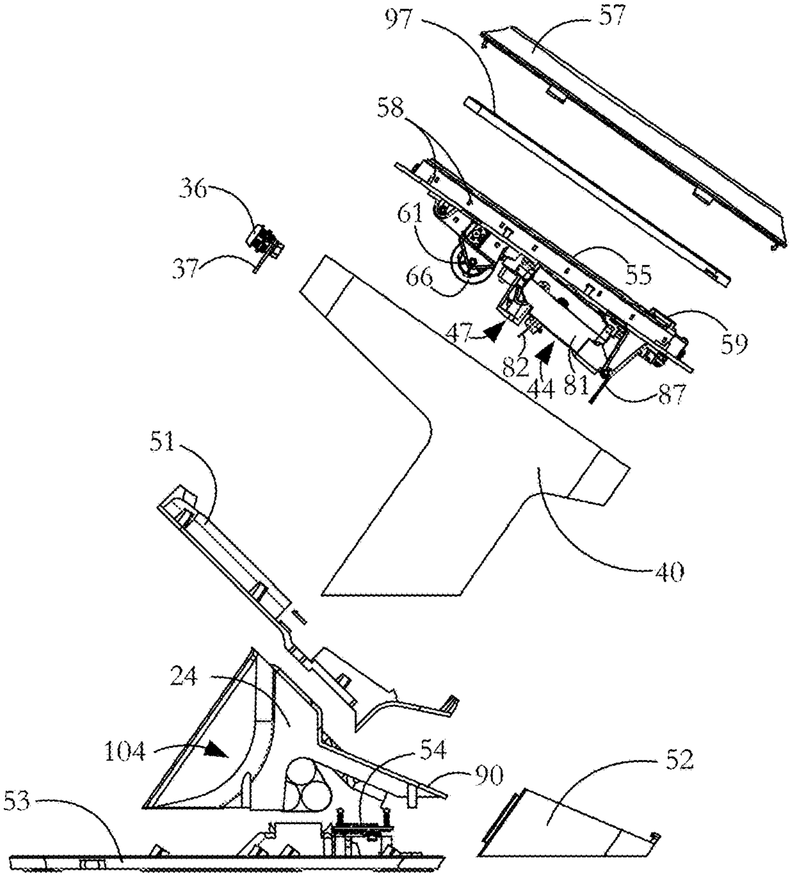
FIG. 9 is an exploded side view of a delivery unit according to an embodiment of the invention.
Figure 10:
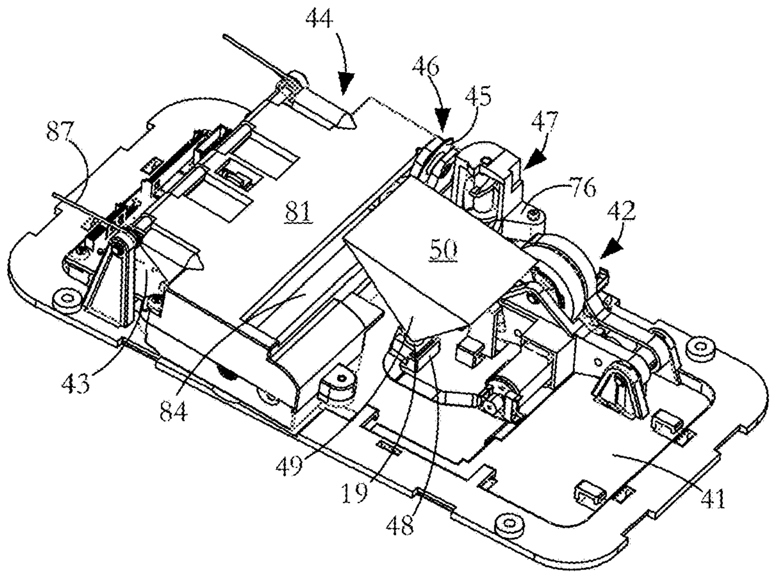
FIG. 10 is an isometric view of a main plate forming part of the delivery unit shown in FIG. 9.

Referring to FIGS. 9 and 10, the delivery unit 11 has a hollow, generally rectangular upper enclosure member 40 with a main plate 41 connected to and closing the top of the upper enclosure member 40. As shown in the FIG. 10 inverted view of the main plate 41, mounted on the lower side of the plate so as to extend into the enclosure member 40 are several sub-systems used in delivering medication pouches to a patient or other user from the medication cartridge 10 when the cartridge is connected to the delivery unit 11. The sub-systems include a pouch strip feed sub-system 42 including feed wheel 61, a pouch strip cutting sub-system 44 including rotary knife 45 and a shuttle 46, and a cam assembly 47. Also mounted at the main plate is wide angle camera 19 that is clipped into housing 48, the camera 19 having a field of view (FOV) schematically indicated at 49, and a depth of focus located at the plane 50 which coincides with the plane of back plate 18 when the cartridge is installed at the delivery unit. The delivery unit sub-systems 42, 44 and 47 work in concert with the clamping foot 23 which is operable to clamp and unclamp a leading pouch to and from the back plate 18 in synchronism with operational steps of the delivery unit sub-systems.

Referring back to FIG. 9, below the upper enclosure member, the delivery unit includes the lower enclosure 24, an inner cover plate 51, a jaw member 52 and a base plate 53 on which is mounted a printed circuit board assembly (PCBA) 54 embodying power connection and distribution functionality. As shown in FIG. 10, a main PCBA 43 is mounted to the main plate 41 and serves as the delivery unit main controller. The controller runs firmware for controlling components such as sensors, LEDs, limit switches, push button, rotary motors, alarm units, etc.

Above the main plate 41 are mounted a display screen 55, an inner bezel 56 surrounding the display screen, a face plate 97 and an outer translucent perimeter bezel 57 which covers a perimeter array of LEDs 58 mounted and arrayed around the main plate. The display screen 55 is used to display information to the user and also has soft keys to permit user data entry. Illumination or flashing of the perimeter LEDs 58 are part of an alarm subsystem triggered each time a medication dose is due to be taken. The alarm subsystem also includes a light at a push button 59 and a customizable audio alarm such as a ringer, buzzer or voice recording. The audio components (now shown) are mounted at the display screen assembly 55. The alarm system signals when it is time to take a medication dose. In one exemplary time sequence, an hour prior to the dose being due, the display screen identifies that the dose is coming due in a preset lead time. At the time the dose is due the alarm and lights are triggered for an interval of time and, unless the dose is delivered, will alarm again every 15 minutes until one hour after the dose was originally due whereupon the dose is considered late. By pressing push button 59, the user acknowledges that it is understood that a medication dose is ready and instructs its delivery. Pressing the button both stops the alarms and initiates the dispense procedure. The alarm system can be programmed by the user to provide 'early warning' and/or 'late warning' to tell the patient that it will soon be time to take medication and/or that the scheduled time to take a medication dose has been missed.

Dispensing push button 59 is mounted on the main plate 41 and must be pressed by the user as a positive instruction to have the scheduled medication dose delivered. In one exemplary sequence, a leading pouch scan occurs upon cartridge docking at the delivery unit and again after each pouch dispense, it being assumed that pouches are not removed or changed unless and until the cartridge is removed. However, depending on inclination and regulation, further checks and pouch scans may be performed before particular medication pouch is deemed ready for delivery.

The delivery unit sub-systems and their interaction will now be described in the context of an action to deliver a medication pouch. The delivery unit 11 cannot be operated unless the cartridge 10 is correctly inserted into the unit because proper and full insertion both furnishes pouches to be dispensed and renders the combination operable.

Figure 13:
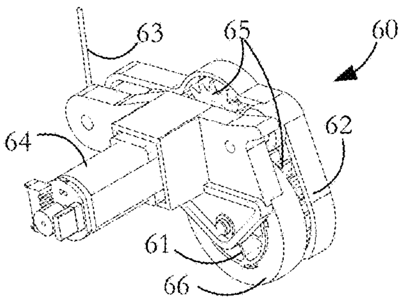
FIG. 13 is an isometric view of a pouch strip advance mechanism for use in a delivery unit according to an embodiment of the invention.
Figure 14:
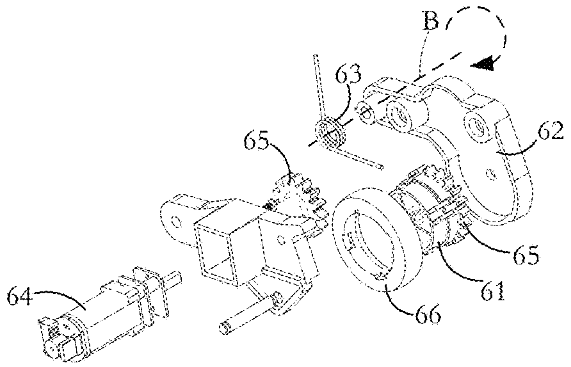
FIG. 14 is an exploded view of the advance mechanism shown in FIG. 13.

Referring to FIGS. 13 and 14, a pouch strip advance mechanism 60 forming part of the strip feed sub-system is operated cooperatively with the clamping foot 23 and cartridge back plate 18 (FIG. 11) and a cam assembly 47 (FIGS. 15 and 16) to feed a leading pouch to a position where it can be severed from the strip and, by the same motion, to feed the linked, immediately following pouch to a position where it overlies the back plate 18 and can be visually inspected by camera 19. The advance mechanism has a feed wheel 61 mounted in a wheel housing 62. The housing 62 is mounted to main plate 41 for angular movement about axis B under a bias from torsion spring 63. The feed wheel 61 is driven forwards or backwards as required by feed wheel motor 64 acting through meshed gears 65 one of the gears being integral with the hub of wheel 61. When a cartridge 10 is inserted into the delivery unit 11, torsion spring 63 angularly forces the wheel housing about axis B to force tire 66 onto a side edge of a leading pouch and against the low friction back plate 18 which the pouch overlies. Mounted on the tire 66 is made of high friction, low stiction material positioned to contact and press one of the heat sealed side edges of the strip against the back plate 18. The tire 66 remains pressed against the side seal of successive pouches through multiple pouch deliveries until the cartridge 10 is empty and is withdrawn from the delivery unit 11.

Figure 12:
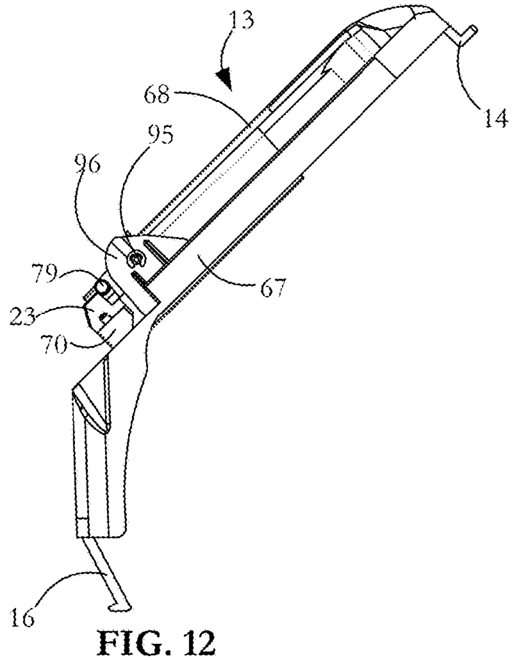
FIG. 12 is a side view of the locking member shown in FIG. 11.

FIGS. 11 and 12 show the canister locking member 13, part of which is formed as the back plate 18 on which is mounted the clamping foot 23. As a pouch is driven onto the back plate 18 under the raised clamping foot 23, pouch side edges are retained by side walls 67 forming part of the locking member 13. The parallel side walls 67 are spaced apart by a distance that is nominally equal to the width of a standard pouch. Although, the spacing can be marginally narrower or wider with minimal impact, too narrow a spacing causes jamming and too wide a spacing causes pouches to skew. A top flange 68 inhibits the unpinned side edge of the pouch from rising if the pouch shows any tendency to fold or buckle, this being particularly important during transport/shipment of a populated cartridge.

Clamping foot 23 is mounted at the end of an arm 94 which is itself mounted for angular movement about shaft 95. The shaft 95 is mounted on support member 96 which is itself mounted on the cartridge back plate 18. The arm is normally biased by torsion spring 69 so that attached foot pad 70 made of high friction, low stiction flexible material is biased against a pouch positioned on the back plate 18. The clamping foot 23 can be lifted by a cam member 71 forming part of the cam assembly 47 (FIGS. 15, 16) between an engaged position in which the foot pad 70 is pressed against and temporarily clamps a leading pouch against back plate 18, and a disengaged position in which the foot pad is spaced from the back plate 18. In the disengaged position, the strip leading end can be driven in a delivery direction causing the coil of pouches in the cartridge chamber to progressively unwind and exit the chamber. The leading pouch is periodically clamped against the back plate by the clamping foot 23 in the course of a pouch delivery procedure taking place at the delivery unit 11. It is also clamped for an extended period of time when the cartridge 10 is being stored or transported, for example between the packaging site and a patient site.

Figure 15:
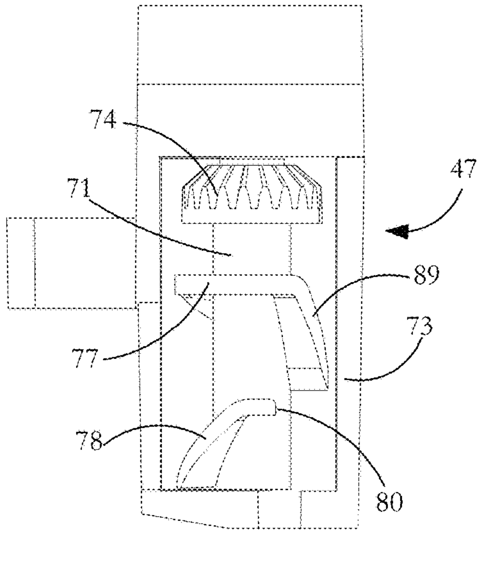
FIG. 15 is a side view of a cam assembly for use in a delivery unit according to an embodiment of the invention.
Figure 16:
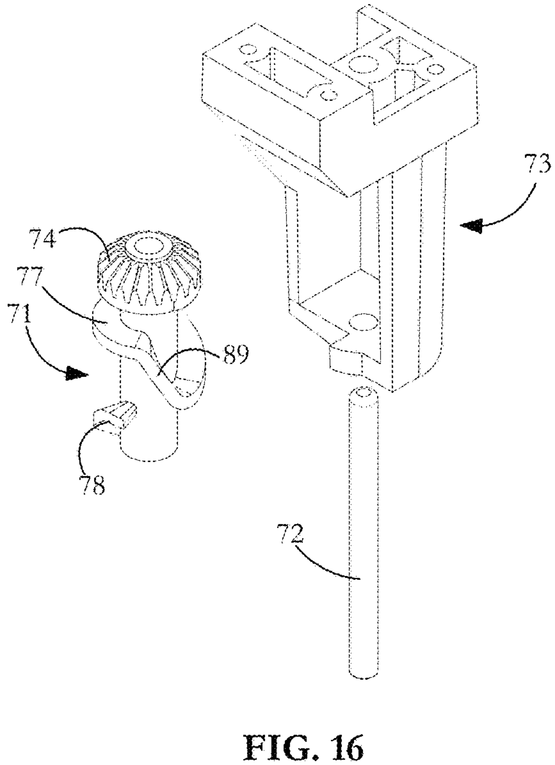
FIG. 16 is an exploded view of the cam assembly shown in FIG. 15.

As shown in FIGS. 10, 15 and 16, the cam member 71 and a pivot shaft 72 on which it rotates are mounted in a housing 73 integral with the main plate 41. The cam member 71 has a bevel gear 74 engaging a drive gear on cam motor 76 and has distinct upper and lower cams 77, 78. Over a first rotational movement of the cam member 71, lower cam 78 controls the position of the clamping foot 23. The lower cam 78 operates to raise the foot 23 so that the feed wheel 61 can be driven to advance the leading end of the pouch strip. As the cam member 71 rotates in a clockwise direction (FIG. 15, looking down), the lower cam 78 drives cam follower projection 79 on the foot 23 against a downward bias from torsion spring 63 to lift the foot pad 70 from its clamping position at one of the pouch strip side edge seams. After the foot 23 is lifted, feed wheel 61 can be driven by rotary motor 64 to slide a leading pouch off the back plate 18 to a cut-ready position and, by the same strip movement, to drive the immediately following pouch onto the back plate 18 into a viewing or inspection position. The clamping foot 23 is then applied to the immediately following pouch. An exemplary method for accurately positioning the pouches for cutting will be described presently.

After the pouches are accurately sited, the cam member 71 is further rotated in a clockwise direction to a position at which a projection 80 forming part of lower cam 78 ends, meaning that cam follower 79 is no longer supported by the lower cam. At this point, the clamping foot 23 drops under the bias of torsion spring 69 to cause the foot pad 70 to again clamp the strip against the back plate 18.

Figure 17:
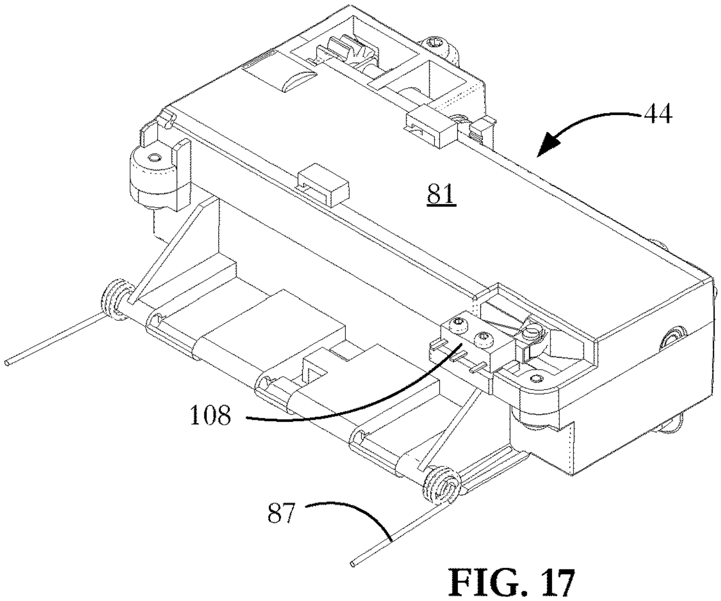
FIG. 17 is an isometric view of a pouch strip cutting sub-system for use in a delivery unit according to an embodiment of the invention.
Figure 18:
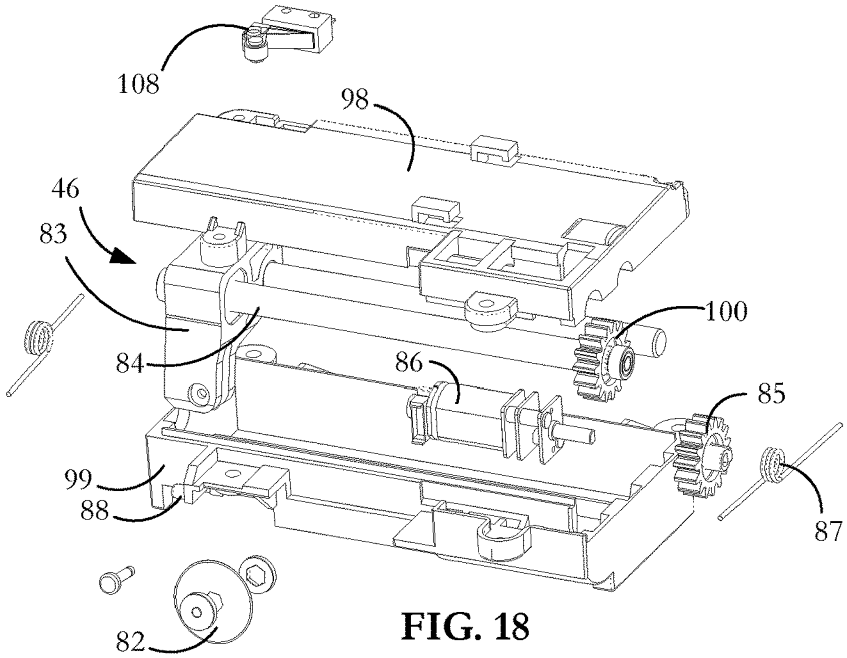
FIG. 18 is an exploded view of the cutting sub-system shown in FIG. 17.
Figure 19:
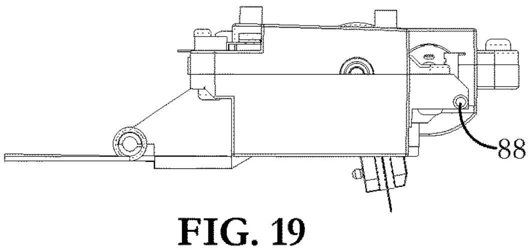
FIG. 19 is a side view of the cutting sub-system shown in FIG. 17.

At this point, the leading pouch, which has been previously inspected and validated, is in a cut-ready position and the immediately following pouch is in an inspection-ready position. Over a second rotational range of the cam member 71, upper cam 77 controls the angular position of a spring biased, hinged chassis 81 which is mounted on the underside of the main plate 41 (FIGS. 17, 18, 19) and forms part of the pouch strip cutting sub-system 44. The chassis has upper and lower housing members 98, 99 with knife shuttle 46 mounted in the housing. The knife shuttle includes an 18 mm diameter circular knife 82 rotatably mounted in a carriage 83, itself mounted for reciprocating shuttle movement in response to axial rotation of lead screw 84 which has a driven gear 100 engaged a drive gear 85 mounted on rotary electric motor 86. The chassis 81 is moveable between a home position in which the knife 82 is raised from the back plate 18 and an operational cutting position. Spaced torsion springs 87 angularly force the chassis 81 and knife 82 to move down towards the cartridge back plate with movement as permitted by the rotation of the cam member 71 and the changing position of the upper cam 77. Subsequent upward movement of the chassis 81 against the bias of springs 87 to a home position is also dependent on cam member rotation and upper cam position. A safety gate 109 prevents access to the knife during normal operation.

In the cutting position, the knife 82 presses an intervening pouch against back plate 18 in preparation for and during the pouch cutting procedure. The cam member 71 is then further rotated to a position at which a second cam follower 88 integral with housing member 99 slides down ramp 89 on upper cam 77 to bring the knife 82 into engagement with the seal region between the leading and immediately following pouch. Under the bias of torsion springs 87, the strip is pressed against the underlying back plate 18. The form of ramp 89 is configured to ensure a gradual approach of the rotary knife 82 towards the back plate 18 rather than an abrupt drop of the knife. The knife blade is thin, hard and sharp with a view to obtaining a high number of pouch cuts before it loses its edge. Such a structure is prone to damage if there is nothing to restrict a high speed fall of the knife. Once the knife is in contact with the pouch, the knife shuttle 46 is operated to drive the knife carriage 83 across the pouch to effect a cut.

There are in fact two cut-ready positions. The first is a 'nick' position and, to reach it, the leading pouch is advanced relatively rapidly part way along the back plate 18 in a first movement. The exact position for making a nick cut does not matter much so long as it is generally part way along the pouch. After a fast initial movement, the leading pouch is advanced slowly until the fiducial formation is detected by the imaging system, at which point the advance movement is halted. Once temporarily pinned in this position by foot 23, the knife shuttle 46 is operated so as to nick one of the pouch sealed edges. The nick provides a weak zone at which the patient or other user can tear the pouch open with less force needed than elsewhere along the pouch edge seal. To subsequently reach a 'full cut' position, the leading end of the strip is advanced in a more closely controlled movement along the back plate 18 to a position in which, once the immediately following pouch has been pinned to the back plate 18 by clamping foot 23, the leading pouch can be fully separated from the immediately following pouch.

The heat seals at the end zones and at the pouch edge remote from the folded edge are relatively hard and so the knife shuttle 46 is operated so as to effect a multiple cut sequence for the full cut. The shuttle is operated initially to make a first cut or score at the heat sealed side edge and then to make a second, full cut across the whole pouch width, each cut span constituting a forward and reverse cut stroke. While the combination cam member 71 illustrated is convenient for achieving coordinated operation of the clamping foot 23 and the knife 82, other drive arrangements are contemplated such as separate actuators. In a further alternative, the knife range of travel is made greater than the pouch width making it unnecessary to raise and lower the knife. Instead, a drive moves the knife to a park position out of the way of the path of the pouch.

A leading pouch can be cut from the rest of the strip only after a full validation has been successfully performed by confirming identity of information as between the pouch indicia and the medication schedule data downloaded from the main platform. In terms of control, it is important that both the hinged chassis 81 and the knife shuttle 46 are at their 'home' positions before a delivery procedure begins and after the procedure ends. To ensure this occurs, limit switches 108 are mounted at end-of-travel positions of both the knife shuttle and the hinged chassis and are triggered only when respective home positions are reached.

Before any forward feeding of the strip, wide angle camera 19 is operated to generate images of the leading pouch overlying the back plate. Leading pouch images are first generated and processed when the cartridge 10 is docked at the delivery unit 11 and are subsequently generated and processed when each new pouch is fed onto the back plate 18.

Positioning the leading and immediately following pouches in preparation for severing the one from the other involves a one- or two-phase feeding movement of the pouch strip. In a continuous drive phase, a pouch is fed onto the back plate and moved to a 'nick' position. In a slower incremental drive phase the pouch is fed to a 'full' cut position, the final adjustment involving stepwise forward and backward movements, with a camera or sensor inspection between movements. The incremental drive is implemented only if the pouch position reached after the first movement is found to be out of tolerance based on inspection of pouch position compared to an ideal or intended position.

The adjustments made depend on the use of, and outputs from, an inspection assembly that includes camera 19 and image analysis software to analyze pouch image data to determine the location of a fiducial marking printed on the pouch positioned on the back plate 18. The stepwise procedure is adopted to obviate positioning inaccuracies that might otherwise occur during a continuous movement phase. The use of stepwise movement and associated image analysis algorithms also ameliorates problems caused by position inconsistencies due to pouches not being rigid or having been repositioned between a transit unconstrained state and the foot clamped state.

In the instant embodiment, two parallel fiducial lines extending generally perpendicularly to the pouch feed direction are printed on each pouch. The lines are printed near one end of the pouch so that they do not occupy a main part of the pouch face reserved for bar code and other medication information. The two lines are spaced about 2 mm apart with one line being a backup to the other. In the viewing algorithm, the information on an imaged pouch is analyzed to detect any and all cross lines with the last line detected being presumed to be the fiducial line. With a 2 mm spacing, it does not matter which of the two fiducial lines is detected as there is a greater than 2 mm tolerance permitted in subsequently setting the position for a pouch cut.

With a double fiducial line, location and skew can be evaluated without having a false positive read on a horizontal feature, such as the serration or scoring of pouch end seal zones effected to facilitate manual separation of pouches from one another. Any horizontal feature is prone to detection as a false positive but if a second closely parallel line detects a negative, then the false positive is ignored and adjustments are made until two positives are detected in an image.

A fiducial line should occupy or be close to an ideal line position for the strip to be cut-ready. When the strip is first fed onto the back plate 18, the fiducial line position of an imaged pouch and the ideal fiducial line position usually coincide within an acceptable threshold, but occasionally do not. An unacceptable difference in position is detected from imaging and is then eliminated by adjusting the pouch position to bring the fiducial and ideal lines into coincidence. Pixel lengths monitored form camera images are translated into drive intervals for the rotary motor both for the relatively slow speed and stepwise phases previously mentioned. In the image analysis software, the position of the pouch is assessed based on the location of the printed fiducial line relative to a configured known center of the camera field of view.

When the detected fiducial line is in the right, i.e. near ideal, position as determined by monitoring an acceptable threshold related to line slope, continuity, then a full cut of the pouch can be performed. If it is not in exactly the right position, re-evaluation and adjustment is repeated until correct positioning is achieved or until efforts to do so time out. At that point, attaining correct positioning using the feed wheel is presumed to be impossible, the cartridge is disconnected from the delivery unit and the pouch strip is manually adjusted with a view to correct feeding when the cartridge is docked back at the delivery unit.

Once severed from a pouch strip, a separated pouch enters a low restriction exit mouth or channel. The channel is downwardly oriented so that delivery is gravity-aided. The channel has a sloping base formed by the juxtaposition of elements of the cartridge back plate 18, an upper part the lower enclosure 24 and a lower part of the lower enclosure. This juxtaposition produces a slope having steps 103 as shown in dotted line 102 in FIG. 4C. These surface sections each have a length less than the full length of a standard sized pouch. The stepped formation reduces the risk of jam points because the leading edge of a falling pouch is unsupported and therefore free of obstruction. At the final step transition, the pouch tends to tip downwardly over the lower enclosure element to an angle that pouch delivery is almost sure to be successful. Even if there is an obstruction at that point, the pouch is sufficiently exposed as to permit a user to pick it from a delivery tray 90.

Figure 20A:
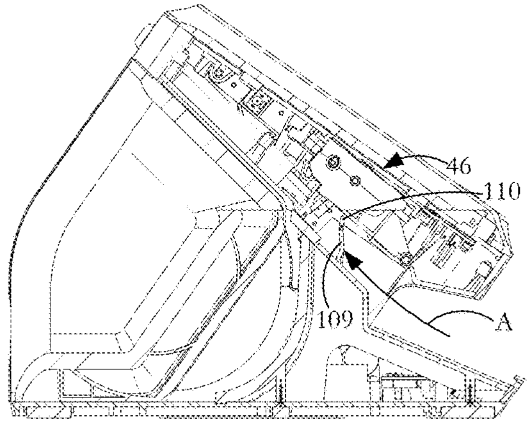
FIGS. 20A to 20C are detail views showing a gate safety feature according to an embodiment of the invention.
Figure 20B:
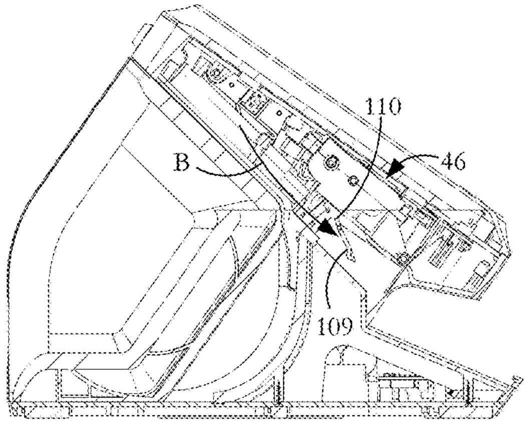
Figure 20C:
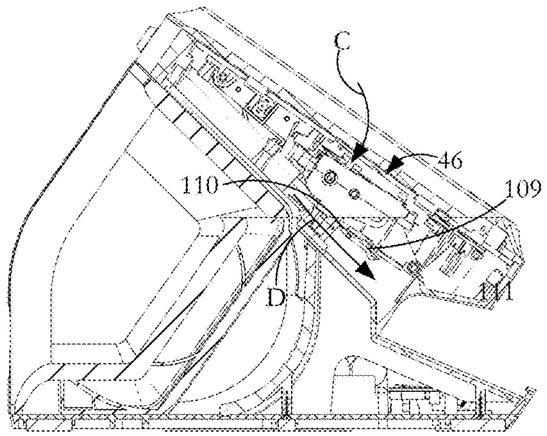
Figure 21A:
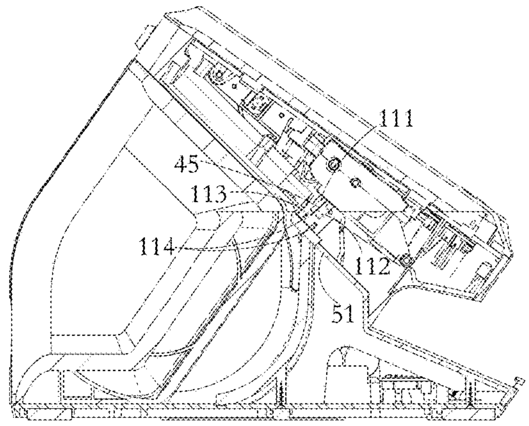
FIGS. 21A and 21B are detail views showing further safety features according to embodiments of the invention.
Figure 21B:
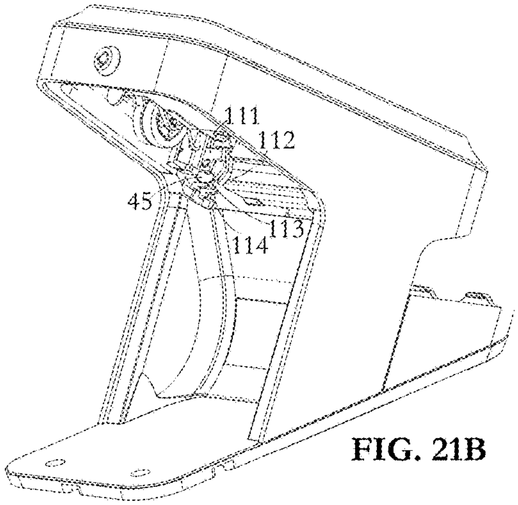

As previously mentioned, the delivery unit has several safety features for preventing user/finger access to the rotary knife. Firstly, as shown in FIGS. 20A-20C, a pivotable gate 109 is mounted in the pouch delivery channel, the gate 109 normally being in a closed position owing to its center of gravity being offset from its pivot axis. In the closed position (FIG. 20A), the gate restricts user/finger access through the user side of the delivery channel because contact against the outer side of gate 109 (arrow A) only acts to keep the gate 109 in the closed position. As a dispensing procedure occurs, a leading pouch of a pouch strip is moved against the inner side of gate 109 (arrow B) and pushes the gate 109 open (FIG. 20B) without restricting forward motion of the pouch. Protruding above the pivot axis, the gate 109 has a cam lobe 110 which is engaged and pressed by knife shuttle 46 when the shuttle moves down to the cutting position (arrow C, FIG. 20C) causing the gate to pivot open. While this provides an opening (arrow D) allowing a separated and falling pouch to pass through the open gate 109 so as to complete the dispensing procedure, access is restricted and finger access is prevented. As a further safety feature as shown in FIGS. 21A-21B, the rotary knife 45 is mounted within a block 111 having an extended guard 112 that limits the amount of exposed blade edge 113 and protects the user from contacting the knife in this position. When the knife is in the home position—fully retracted and raised up—the knife block 111 with guard 112 is nested above inner plate to fully restrict access to the knife 45. Guard fingers 114 integral with inner cover plate 51 prevent access to the bottom of the knife 45 when the cartridge is removed and the knife 45 is in the home position. The guard fingers 114 provide clearance for the rotary knife 45 to pass through but limit access by user/fingers.

Figure 4D:
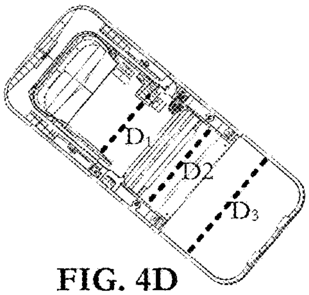
FIG. 4D is a sectional view on the line 4D-4D of FIG. 4A.

As shown in FIG. 4D, the exit channel also becomes progressively wider before ending at the delivery tray as shown by the increasing mouth widths $D_1$, $D_2$, $D_3$. The widening of the channel reduces the risk of a pouch coming to a premature halt owing to one of its edges becoming snagged at a side wall. The tray has an end barrier 91 to halt the falling pouch, the barrier having a central dip 92 to allow finger access to a dropped pouch. Spaced regions of the barrier have overhanging flanges 93 for reducing the chance of a delivered pouch bouncing out of the end of the tray 90 when it hits the barrier 91.

A check is implemented following each full knife cut to ensure that complete separation of a pouch from a trailing pouch really has occurred. In the check procedure, after an apparent full cut is completed at the junction between a leading pouch and an immediately following pouch, if the cut is successful, the severed pouch will fall into the tray 90 while, if the cut has not been successful, the partially cut pouch may remain connected to the strip. To address the problem of a hanging pouch, after an intended full cut, the feed wheel 61, which is located close to, but behind, the clamping foot 23 in relation to the feed direction, is operated to drive the immediately following pouch and the strip connected to it a set distance in reverse. The clamping foot 23 is then applied at the expected site of the leading pouch, were it not completely severed from the strip so as to press the supposed unsevered leading pouch against the back plate 18. The feed wheel 61 is again operated to drive the strip in reverse, this motion acting to pull the following pouch away from the leading pouch if the leading pouch is not fully severed. Finally, the clamping foot 23 is lifted and the following pouch and strip are forwardly fed in preparation for a further delivery procedure. A suitable sensor arrangement is used to monitor that a full has been performed and that the pouch has fallen into the delivery tray as expected. In one exemplary arrangement, a first electro-optical sensor looks at a position upstream of the delivery tray to ensure that a pouch is presented at the time of a full cut and that the pouch drops clear of the cut area once it has been severed from the strip. Within a predetermined period of a full cut being implemented, a second electro-optical sensor looks at a position near the expected trailing edge of the pouch in the in-tray position. In the absence of a positive signal from the sensor arrangement, a partially severed pouch, a chute obstruction or static retention of the pouch is presumed for which an information message is presented to the user to prompt remedial action FIG. 3 shows actions resulting when the delivery unit push-button is pressed. Initially, the cam member is checked to ensure it is at its home position and the camera is checked to ensure it is in a position and state to start capturing image frames of pouches after they are successively fed onto the back plate. The clamping foot is lifted and, in an initial pouch feed, the controller issues a command to fast move the feed motor with motor encoder feedback being used to detect how far the leading pouch moves. The feed motor is then slowed to reduce risk of the camera missing a fiducial line. The leading pouch is then fed to a 'nick' position by detecting the fiducial line. An algorithm designed to detect a fiducial line on a clear plastic pouch while overcoming image artefacts arising from partially reflective surfaces, crinkled pouch topography, and views obstructed by pills, has the following general sequence.

a) Capture image frame
b) Crop frame to relevant subsection
c) Frame pre-processing:
i. Identify and suppress artifacts such as pills and film crinkles.
ii. Convert to grayscale.
iii. Perform blur algorithm to minor gaps in line.
iv. Perform adaptive light threshold algorithm (to compensate for any inconsistent lighting over frame area).
d) Detect lines.
i. Perform Hough line transform algorithm to find lines in frame.
ii. Line false positive detection.
iii. Fiducial lines are close to, but not exactly, horizontal. If line generated from previous step is too short or on too steep an angle (|slope|>0.5), filter out.
iv. False positives filtered out on basis of expected feed distance. In forward feed, fiducial line position should increase. If line detected at a decreased position greater than set threshold, filter out.

e) Return lines for processing

In further explanation of this sequence of steps, image manipulation of a camera frame prior to detect fiducial lines is the primary method for reducing fiducial line false positives, the image manipulation being embodied in the image processing algorithms (e.g. Hough transform, adaptive thresholding). In addition, two secondary methods are adopted for reducing false positives. Firstly, the area of the camera frame is changed based on the two dispensing phases: moving to the nick position and moving to the full cut position. Excluding frame areas improves performance by increasing the frame processing rate, thereby reducing lag time between the camera taking a frame and the algorithm finding a fiducial line. If the fiducial line is detected, the pouch is concluded to be correctly sited and a nick cut is made.

The pouch is then fed to a 'full cut' position by:

a) Calculating distance between current fiducial line position and ideal fiducial line position.

b) Translating the difference in pixels to difference in feed motor encoder units required to drive motor a required rotational distance.

c) Driving feed motor through that distance.

with detection of a fiducial line being made using the a-e sequence above.

A 'moving window' is used while feeding to the 'full cut' position by keeping track of a 'previous' fiducial position. Typically, the window size increases as the strip is fed forward. The fiducial line is detected as it and the moving window move forward. The window has a relatively large memory buffer to account for any unexpected change in the strip movement (slippage or jumping forward), but it has been shown to help with ignoring false positives correctly.

If the current fiducial line is within an acceptable threshold of the ideal fiducial position a full cut sequence is performed.

a) First short cut over heat seal width.

b) Second short cut over heat seal width.

c) Full cut across whole pouch width.

d) Sensor assessment: has pouch dropped into tray?

e) Yes? Cam mechanism is moved to home position. Blade and cartridge foot are ready for barcode scan and next pouch delivery.

f) No? Perform clamp and pull.

i. Lift cartridge foot.

ii. Reverse feed.

iii. Put cartridge foot down on pouch to be delivered.

iv. Reverse feed to pull following pouch away from pouch to be delivered.

v. Lift cartridge foot.

vi. Feed strip forward until fiducial line is in ideal fiducial line position.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. An assembly for delivering medication comprising a cartridge container containing a strip of linked medication-containing pouches, and a delivery unit enclosure, the cartridge container being external to the delivery unit enclosure and engaged therewith to enable delivery of the medication-containing pouches from the cartridge container through the delivery unit enclosure to a user access zone, the cartridge container being complementary in shape to the delivery unit enclosure at an interface therebetween, the delivery unit enclosure containing an advance mechanism operable to engage and to advance pouches of the strip successively out of the cartridge container and to a separation station, an inspection mechanism to inspect indicia on the pouches, a separation mechanism at the separation station for separating the pouch at the leading end of the strip from the adjacent pouch, and an exit route from the delivery unit enclosure for routing the separated pouch to the user access zone.

2. The assembly as claimed in claim 1, wherein the cartridge container is disengageable from the delivery unit enclosure and is re-engageable therewith by relatively orientating the cartridge container and the delivery unit enclosure so that the complementary shapes thereof face one another, and relatively moving the cartridge container and the delivery unit enclosure together.

3. The assembly as claimed in claim 2, wherein the complementary shapes are a projecting part of the cartridge container and a receiving bay in the delivery unit enclosure.

4. The assembly as claimed in claim 2, wherein, with the cartridge container and the delivery unit enclosure engaged the cartridge container is held to the delivery unit enclosure by magnetic attraction between a magnet on the cartridge container and a magnet on the delivery unit enclosure.

5. The assembly as claimed in claim 1, wherein the strip of linked medication-containing pouches is in the form of a coil and the cartridge container has a chamber for accommodating the coil, the chamber at least partially externally defined by at least one arcuate wall.

6. The assembly as claimed in claim 4, wherein, with the cartridge container and the delivery unit enclosure disengaged and relatively orientated so that the complementary shapes face one another, when the cartridge container and the delivery unit enclosure are moved together, magnetic attraction moves the cartridge container into engagement with the delivery unit enclosure when the cartridge container is separated from the delivery unit enclosure by a preset distance determined by the strength of the magnetic attraction.

7. The assembly as claimed in claim 1, the cartridge container having a cartridge container engagement site immediately adjacent a delivery unit enclosure engagement site when the cartridge container and the delivery unit enclosure are engaged, the engagement sites having surface formations preventing lateral movement of the cartridge container relative to the delivery unit enclosure.

8. The assembly as claimed in claim 1, wherein, with the cartridge container and the delivery unit enclosure engaged, the cartridge container has a front side engaging the delivery unit enclosure, the cartridge container having a back side shaped and sized for palm-of-the-hand gripping of the cartridge container.

9. The assembly as claimed in claim 1, wherein, with the cartridge container and the delivery unit enclosure engaged, the cartridge container has a front side engaging the delivery unit enclosure, the cartridge container having a back side and a finger hold formation in the back side to enable finger pulling of the cartridge container to separate the cartridge container from the delivery unit enclosure.

10. The assembly as claimed in claim 5, wherein the cartridge container has two inter-engaging shell members, and a lock member movable between a first position to lock the shell members together to enclose the chamber and a second position enabling unlocking of the shell members to provide access to the chamber interior.

11. The assembly as claimed in claim 5, further comprising a guidance route for pouches of the strip thereof successively driven out of the chamber, the guidance route including a lobe over which successive pouches are driven, the lobe having a downstream region of relatively high radius of curvature and a contiguous upstream region of relatively low radius of curvature.

12. The assembly as claimed in claim 1, wherein the separation mechanism includes a rotary knife.

13. The assembly as claimed in claim 1, further comprising a delivery route sloping downwardly from the separation station to a delivery tray, the delivery route having a base formed as a series of descending steps.

14. The assembly as claimed in claim in claim 13, the delivery route having opposed side walls, spacing of the opposed side walls increasing from an upstream route position to a downstream route position.

15. The assembly as claimed in claim 13, the delivery tray having a barrier wall for halting motion of a falling pouch, the barrier wall having a lower center part for facilitating finger access to a halted pouch.

16. The assembly as claimed in claim 13, the delivery tray having a barrier wall for halting motion of a falling pouch, the barrier wall having an overhanging flange for preventing a pouch from bouncing out of the tray on being halted at the barrier.

17. The assembly as claimed in claim 1, wherein the advance mechanism includes a drivable wheel mounted to the delivery unit enclosure, the wheel having a pouch-contacting surface of high friction, low stiction material.

18. The assembly as claimed in claim 17, wherein the wheel is spring biased towards a cartridge container back plate.

19. The assembly as claimed in claim 1, further comprising a cam member mounted on the delivery unit enclosure and a pouch strip clamping foot mounted at the cartridge container to clamp the strip against movement thereof in a feed direction, the cam member having a first cam engageable with the clamping foot upon rotation of the cam member to lift the clamping foot from the pouch strip and to permit movement thereof in the feed direction.

20. The assembly as claimed in claim 1, further comprising a cam member and a knife shuttle mounted on the delivery unit enclosure, the cam member having a cam engageable with a cam follower forming part of the knife shuttle upon rotation of the cam member to control movement of the knife shuttle between a home position and an operational position in which a knife bears against the pouch strip.

* * * * *